(12) United States Patent
Siboni

(10) Patent No.: US 8,967,539 B2
(45) Date of Patent: Mar. 3, 2015

(54) METHOD FOR ASSEMBLING A FLOOR IN A COCKPIT STRUCTURE PREVIOUSLY CONSTRUCTED FROM A SECTION OF AIRCRAFT FUSELAGE

(75) Inventor: Laurent Siboni, Tournefeuille (FR)

(73) Assignee: Airbus Operations S.A.S., Toulouse (FR)

( * ) Notice: Subject to any disclaimer, the term of this patent is extended or adjusted under 35 U.S.C. 154(b) by 694 days.

(21) Appl. No.: 13/001,699

(22) PCT Filed: Jun. 25, 2009

(86) PCT No.: PCT/FR2009/051215
§ 371 (c)(1),
(2), (4) Date: May 18, 2011

(87) PCT Pub. No.: WO2010/004172
PCT Pub. Date: Jan. 14, 2010

(65) Prior Publication Data
US 2011/0315821 A1 Dec. 29, 2011

(30) Foreign Application Priority Data

Jun. 30, 2008 (FR) ..................................... 08 54412

(51) Int. Cl.
| | | |
|---|---|---|
| *B64C 1/00* | (2006.01) | |
| *B64C 1/06* | (2006.01) | |
| *B64C 1/18* | (2006.01) | |

(52) U.S. Cl.
CPC .. *B64C 1/068* (2013.01); *B64C 1/18* (2013.01)
USPC ...................................... 244/119; 244/117 R

(58) Field of Classification Search
CPC ............. B64C 1/18; B64C 1/068; B64D 9/00
USPC ........................ 244/117 R, 119, 118.1, 118.2
See application file for complete search history.

(56) References Cited

U.S. PATENT DOCUMENTS 4,479,621 A  10/1984 Bergholz
4,621,780 A * 11/1986 Doyhamboure et al. .. 244/118.2
(Continued)

FOREIGN PATENT DOCUMENTS

DE   10 2005 045 181 A1   4/2007
DE   10 2006 026 168 A1   1/2008
(Continued)

OTHER PUBLICATIONS

International Preliminary Search Report and Written Opinion issued Jan. 17, 2011, in French Patent Application No. PCT/FR2009/051215 (with English translation of category of cited documents).

*Primary Examiner* — Rob Swiatek
*Assistant Examiner* — Timothy Schwarz
(74) *Attorney, Agent, or Firm* — Oblon, McClelland, Maier & Neustadt, L.L.P.

(57) ABSTRACT

A section of aircraft fuselage includes a body structure and a floor connected to the body structure. The body structure has an external skin and a framework including frames, positioned in fuselage cross-sections approximately perpendicular to a longitudinal axis in an aircraft reference frame. The floor has cross members extending along a lateral axis. The cross members and the frames are disconnected and each cross member, at opposite ends, is fixed to the body structure by an intermediate structural assembly connected on the one hand to the cross member and on the other hand to the external skin and/or to one or more frames.

10 Claims, 6 Drawing Sheets

(56) References Cited

U.S. PATENT DOCUMENTS

| | | | |
|---|---|---|---|
| 4,984,756 A * | 1/1991 | Anders | 244/137.1 |
| 6,003,812 A * | 12/1999 | Micale et al. | 244/117 R |
| 6,554,225 B1 * | 4/2003 | Anast et al. | 244/117 R |
| 7,191,982 B2 * | 3/2007 | Vetillard et al. | 244/119 |
| 2006/0006283 A1 * | 1/2006 | Vetillard et al. | 244/119 |
| 2007/0176048 A1 * | 8/2007 | Huber et al. | 244/119 |
| 2008/0093503 A1 | 4/2008 | Cacciaguerra | |
| 2008/0217478 A1 | 9/2008 | Keeler et al. | |
| 2009/0236472 A1 * | 9/2009 | Wood | 244/119 |
| 2009/0294588 A1 * | 12/2009 | Griess et al. | 244/121 |
| 2009/0321569 A1 | 12/2009 | Schroeer et al. | |
| 2010/0001134 A1 * | 1/2010 | Braeutigam et al. | 244/119 |
| 2010/0044510 A1 | 2/2010 | Schroeer et al. | |

FOREIGN PATENT DOCUMENTS

| WO | WO 2006/051235 A1 | 5/2006 |
|---|---|---|
| WO | WO 2007/122246 A1 | 11/2007 |
| WO | WO 2008/109711 A1 | 9/2008 |

* cited by examiner

Coupe AA

METHOD FOR ASSEMBLING A FLOOR IN A COCKPIT STRUCTURE PREVIOUSLY CONSTRUCTED FROM A SECTION OF AIRCRAFT FUSELAGE

BACKGROUND OF THE INVENTION

The present invention relates to the field of assembling an aircraft's primary structures. More specifically, the invention relates to a method of assembling a floor structure in a section of aircraft fuselage whose cockpit has been constructed previously.

An aircraft is made from an assembly of elements that play a role in forming the primary structure.

A fuselage is a special case of a primary structure comprising a body structure 2 and a floor 4, and is produced, for example, by assembling two or more sections. Generally, for body structure 2, each section is constructed from several stiffened panels assembled together to form a layer. Said panels comprise a skin 21 in the form of a metal or composite sheet formed according to the required profile, longitudinal stiffeners, known as stringers 25, fixed to the skin 21 by riveting, welding, bonding or co-firing depending on the nature of the materials present, and transverse stiffeners, known as frames 23, connected to the skin 21 and stringers 25 by riveting, welding, bonding or co-firing. The frames 23 are positioned along segments of the fuselage approximately perpendicular to a longitudinal axis X of the aircraft. The stringers 25 extend over the panels approximately along the longitudinal axis X.

The floor 4 is a primary structure inside the body structure 2 of the fuselage. A floor segment is constructed from an assembly of cross members 41 and rails 42, 43. The cross members 41 are generally straight and horizontal, in an aircraft reference frame, and extend perpendicular to the longitudinal axis X along an axis Y of the aircraft. Their role is to channel the forces related to the load on the floor towards the fuselage body structure. The rails 42, 43 extend along the longitudinal axis X. They are used to fix pieces of furniture, such as seats or monuments.

Among the rails, rails 43, known as false rails as they are not used to fix cabin items on the floor, are installed close to frame 23-cross member 41 connectors to strengthen the structure.

Many connections are required to produce the body structure 2 and the floor 4 assembly.

Thus in order to channel forces (mostly the weight of a load on the floor) to the fuselage body structure, the cross members 41 are fixed to the frames 23. In a specific segment Y of the fuselage, the cross member 41 located in this segment is therefore fixed to the frame 23 located in the same segment Y of the fuselage, firstly to one end and secondly by means of a brace to another point (52) of the frame.

In addition, to stabilize the floor and absorb the energy generated by a deceleration along the longitudinal axis X in the event of a crash, anti-crash rods 6 connect firstly, at a first end 61, a stringer 25 and secondly, at a second end 62 opposite the first end 61, the false rail 43.

These multiple connections between the floor and the fuselage body structure mean that the floor must to be added to the fuselage while the body structure is not yet closed circumferentially.

Effectively, the floor must form a reference surface that is flat and perfectly aligned with the aircraft's XY axes. Given the large dimensions of elements present it should therefore preferably be pre-assembled at the scale of the section and integrated to it as a constructed sub-assembly. Integrating the floor in the aircraft cockpit cross member by cross member would entail complex adjustments and would be economically unfavorable.

In addition, each floor cross member must be matched to a frame in order to be fixed to it. This relative positioning of the pre-assembled floor with respect to the body structure is statically indeterminate and requires a systematic realization of both the floor and the fuselage. The cross members and the frames are structural elements designed to channel significant force flows and therefore both are very rigid. As a result, these elements are not able to deform in order to adapt to any misalignment. It is therefore preferable to assemble the floor with a lower portion of the body structure, known as the lower tub, before said lower section receives an upper portion of the body structure, known as the upper roof section, which closes the body structure.

One known method for assembling a fuselage section comprising a body structure inside of which a floor is attached consists of:
  aligning the floor 4 on a special tool,
  positioning frame sectors and then panels forming the sides of the floor on said frame sectors,
  bonding and fixing the lower tub on the frame sectors, the tub itself being constructed by the assembly of stiffened panels,
  bonding the upper portion, known as the roof, on the tub assembled to the floor and thus closing the structure,
  installing and assembling the braces.

According to this method, the fuselage's body structure is constructed from stiffened panels assembled into subsets around the previously produced floor. Each cross member is individually linked at each of its ends to the body structure by an embedding connection. Embedding refers to a complete connection able to transmit all the forces and all the moments in the 3 spatial directions. This embedding connection stabilizes each cross member individually particularly with respect to modes of bending according to X or Z axis moments and with respect to modes of torsion and buckling according to Y axis moments.

The constant improvement in aircraft performance today spurs the increasingly common use of structural elements (panels, frames, stringers) made of composite material for the aircraft's fuselage structure, due to the weight reductions that can be obtained for such structures with these composite materials.

The use of composite materials for the manufacture of fuselage structures allows a one-piece fuselage body structure to be produced, known as a full-barrel composite fuselage. The floor and the body structure can therefore no longer be assembled to form a fuselage section by the method currently utilized and described above.

Moreover, putting a previously assembled floor in place in the circumferentially closed body structure increases the difficulties linked to the manufacturing tolerances and static indeterminacy of the installation, since the body structure thus closed is extremely rigid and misalignments cannot be compensated for by the structure's elastic deformation.

There is therefore a need for a fuselage structure able to allow a previously constructed floor to be assembled economically in a circumferentially closed body structure, and to allow slight misalignments between the floor cross members and frames to be compensated for.

A composite floor piece able to be inserted into a fuselage section forming a circumferentially closed cockpit is known from U.S. Pat. No. 4,479,621. Said floor is constructed from an assembly of one-piece plates comprising longitudinal stiffeners extending parallel to the X axis of the fuselage enclosed between two plates made of a composite material. Such a floor has a smaller width than the interior diameter of the fuselage measured at the tops of the frames and can therefore be introduced into the constructed section, plate by plate. It is then linked structurally to the body structure through articulated rods that allow slight misalignments between the floor's attachment points and the frames' points for spreading forces to be compensated for. This technical solution of the prior state of the art has two drawbacks:

if the floor structure experiences deterioration during the aircraft's operation, repairs are complex because they entail changing the entire plate that has undergone the deterioration and thus extracting it from the fuselage.

the relative movements of the parts at the joints of the rod connections, combined with contact with humidity and corrosive chemicals, particularly in the floor area, result in deterioration problems for said joints through fretting and fretting corrosion.

The other solutions known from the prior state of the art, for example in German patent application DE 10 2005 045 181 A or in European patent applications EP 1 614 625 A and EP 2 030 891 A also make use of rod connections and therefore suffer the same risk of deterioration of these connections by friction and corrosion or use one-piece floor elements, for example in international application WO 2008 1097711 A, which therefore suffer the disadvantages cited above concerning the possibility of repair.

BRIEF SUMMARY OF THE INVENTION

The purpose of the invention is to propose a new fuselage section structure associated with a new method of assembling such a section, which allows the easy assembly of said pre-assembled floor in a circumferentially closed body structure without the drawbacks of the prior state of the art.

A section of aircraft fuselage comprises a body structure, circumferentially closed, and a floor connected to said body structure; the section is associated with a section reference frame defined by a longitudinal axis X, a lateral axis Y in a plane perpendicular to the longitudinal axis X oriented in a horizontal direction when the floor is horizontal and comprising a Z axis in a plane perpendicular to the longitudinal axis X oriented in a vertical direction when the floor is horizontal. The body structure comprises:

at least two frames, positioned along fuselage segments substantially perpendicular to the longitudinal axis X,
 an external skin supported on each frame, each frame defining an obstacle-free interior width, at floor level, known as free frame passage $l_{Cx}$, the free frame passages of successive frames being increasing or decreasing monotonic functions of the position X. The floor has at least two cross members, each cross member being parallel to the lateral axis Y and substantially in a frame plane.

According to the invention, for each position along the longitudinal axis X defined by a segment of the section comprising a frame and a cross member, and at every point of each free frame passage, a length $L_{Tx}$ of the cross member is less than the free frame passage $l_{Cx}$.

According to the invention, each cross member, at opposite ends, is fixed to the body structure by an intermediate structural assembly, connected on the one hand to the cross member and on the other hand to the external skin and/or to one or more frames, and able to realize the individual embedding connection of each end of each cross member with the body structure.

As a result, the floor can be introduced pre-assembled into the circumferentially closed section and it is possible, after the aircraft's assembly and during repair operations, to individually change each cross member of the floor. Moreover, the cross member/cockpit section connection does not suffer from the drawbacks of the prior state of the art since it does not comprise joints.

In an embodiment, the intermediate structural assembly comprises one or more support members, connected to all or some of the frames, forming a structure known as a cornice. Said cornice comprises a core defining a first bearing surface positioned vertically along the Z axis in the section reference frame such that said first bearing surface of the cornice core has a width $l_b$, along the lateral axis Y, substantially greater than a height h of the frame and defines a mounting surface on which the ends of the floor's cross members are placed.

Advantageously, for connecting the cornice to the layer, the cornice comprises a baseplate having a bearing surface substantially flush with a bearing surface of an outer baseplate of each frame and fixed to an inner surface of the external skin.

In an example of realization, at least one support element forming the cornice extends along the X axis on at least two inter-frames and comprises at least one notch for the passage of each frame.

Thus, said cornice contributes to the rigidity of the fuselage and replaces one or more stringers, thus reducing its impact on the overall mass of the section.

Preferably, in order to strengthen the core of the cornice, each frame/cornice connection comprises at least one bracket, said at least one bracket comprising at least two surfaces, a first surface, known as the baseplate, connected to the core of the cornice and a second surface, known as the core, connected to the core of the frame.

In an example of realization, a bracket is fixed on a part of the core of the frame and extends under the cornice in a direction opposite to the external skin, beyond the frame.

Preferably, to provide air circulation between a space located above the floor and a space below the floor, the core of the cornice has air communication openings between the two spaces. Thus any excess pressure differential between the space under the floor and the space above the floor is avoided.

In an example of realization, to stabilize the floor, the floor comprises a set of stabilizing elements forming a structure, known as a longitudinal beam, connected to all or some of the cross members, at the ends of said cross members, and fixed to the first bearing surface of the core of the cornice.

In an enhanced embodiment, at least one cross member is fixed to a frame at each of its ends by a fishplate to serve as a reference frame.

The invention also relates to a method for assembling a floor on a body structure of a section of aircraft fuselage which comprises the steps of:

producing the body structure comprising the frames and external skin,
 producing the floor comprising the cross members, independent of the production of the body structure, such that each cross member is shorter than the free frame passage at the X position of the cross member in question,
 introducing the floor into the body structure on the side of the frame with the widest free frame passage, approximately in its Z destination position and structural junction of the floor and the body structure by an intermediate structural assembly able to produce an individual embedding connection for each end of each cross member

BRIEF DESCRIPTION OF THE SEVERAL VIEWS OF THE DRAWINGS

The detailed description of the invention is made with reference to the figures, which represent.

DETAILED DESCRIPTION OF THE INVENTION

An aircraft has a fuselage comprising at least one section each comprising a body structure 2 on which a floor 4 is fixed.

The body structure 2 and floor 4 are produced in a metallic material or a composite material.

The example of realization, with reference to FIGS. 2a to 10, is described in detail in the case of a front section of a body structure of an aircraft fuselage and associated front floor without this choice limiting the invention. The implementation of the invention can be adapted to any cockpit fuselage structure section, and an associated floor segment, without departing from the scope of the invention.

In the following description, by convention, in a section reference frame, X refers to a longitudinal axis of the aircraft substantially parallel to a longitudinal axis of the aircraft when said section is assembled in an aircraft fuselage, Y refers to a lateral axis substantially in a plane perpendicular to the longitudinal axis X and oriented in a horizontal direction when the floor 4 is horizontal, and Z refers to a vertical axis substantially in a plane perpendicular to the longitudinal axis and oriented in a vertical direction when the floor is horizontal, the three axes being orthogonal.

Figure 1:
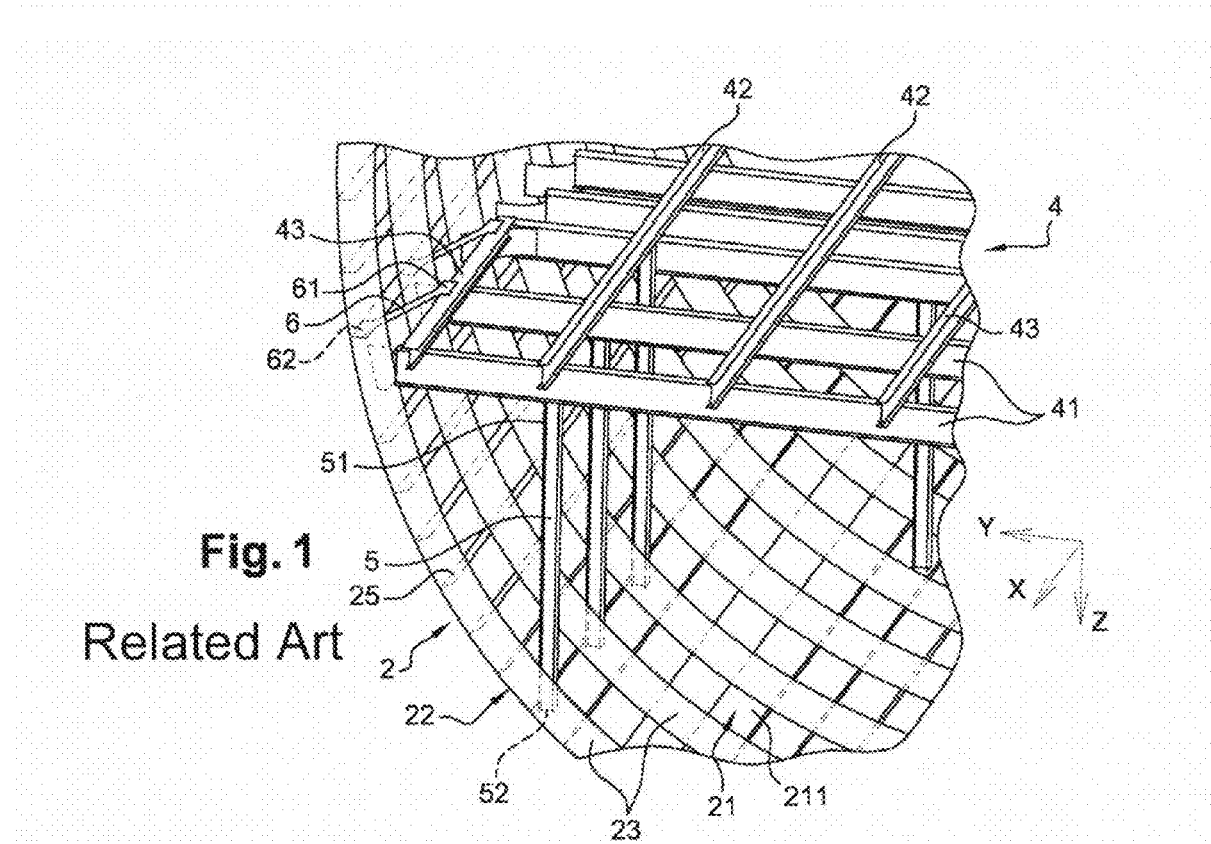
FIG. 1, already cited, an example of an aircraft fuselage in which a floor and a body structure are assembled according to a method of the prior state of the art, FIG. 2a, an example of a front body structure an aircraft, FIG. 2b, an example of a front floor of an aircraft, FIG. 3a, a cross-section view of a frame, FIG. 3b, a cross-section view of a cross member, FIG. 4, a cross-section view of an aircraft fuselage section at floor level, FIG. 5, an assembly of the floor on the aircraft body structure according to a first embodiment of the invention, FIG. 6, a perspective view of a cornice for an assembly of the floor on the body structure according to a second embodiment of the invention, FIG. 7, a perspective view of the cornice at a frame according to the second embodiment of the invention.
Figure 2A:
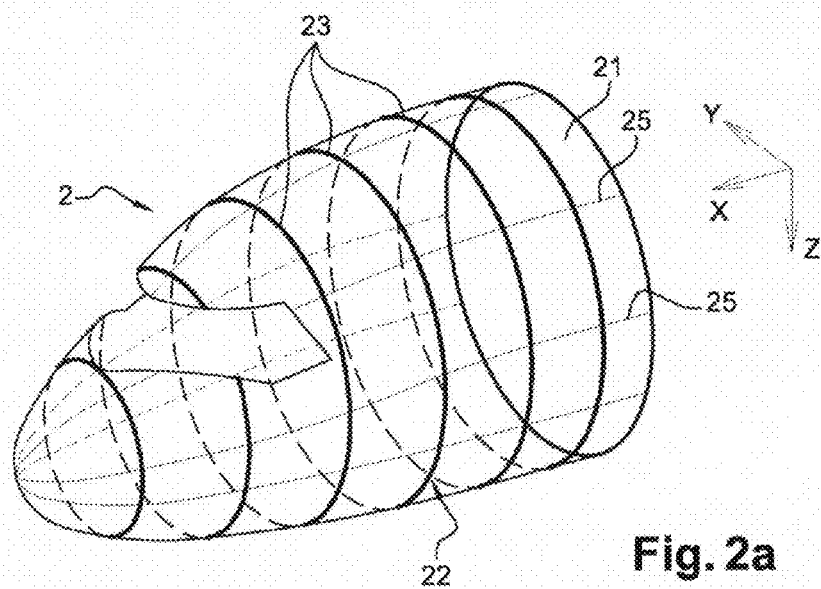

The section of aircraft fuselage comprises the body structure 2, closed circumferentially, itself comprising, as shown in FIG. 2a, an external skin 21, an inner surface 211 of which is fixed to a framework 22 so as to provide the necessary rigidity to said fuselage.

The framework 22 of the body structure 2 of the aircraft fuselage section is mainly constructed of frames 23 and stringers 25. The stringers 25 extend substantially along the longitudinal axis X of the aircraft. The frames 23 are positioned along fuselage segments substantially perpendicular to the longitudinal axis X of the fuselage 2 and are distributed over the length of the aircraft fuselage section at a more or less regular pitch. Each of them has a shape which corresponds substantially to the local segment of the fuselage section, e.g. circular, at least locally, as in the example in FIG. 2a, at a current segment.

There are, for example, the same number of frames 23 and cross members 41 and they are distributed in the same way along the longitudinal axis X.

Figure 3A:
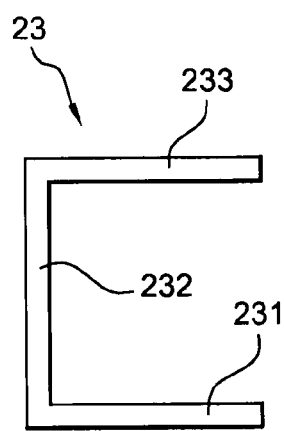

In the example of realization described, as shown in FIG. 3a, each frame 23 has a C-shaped cross section and comprises an outer baseplate 231, a core 232 and an interior baseplate 233. The frames 23 are basically frames that reinforce the body structure and have a height h.

Frames with a different cross section are also possible, for example an I-, J- or T-shaped cross section.

The outer baseplate 231 has a bearing surface 2311 fixed to the inner surface 211 of the external skin 21.

Figure 4:
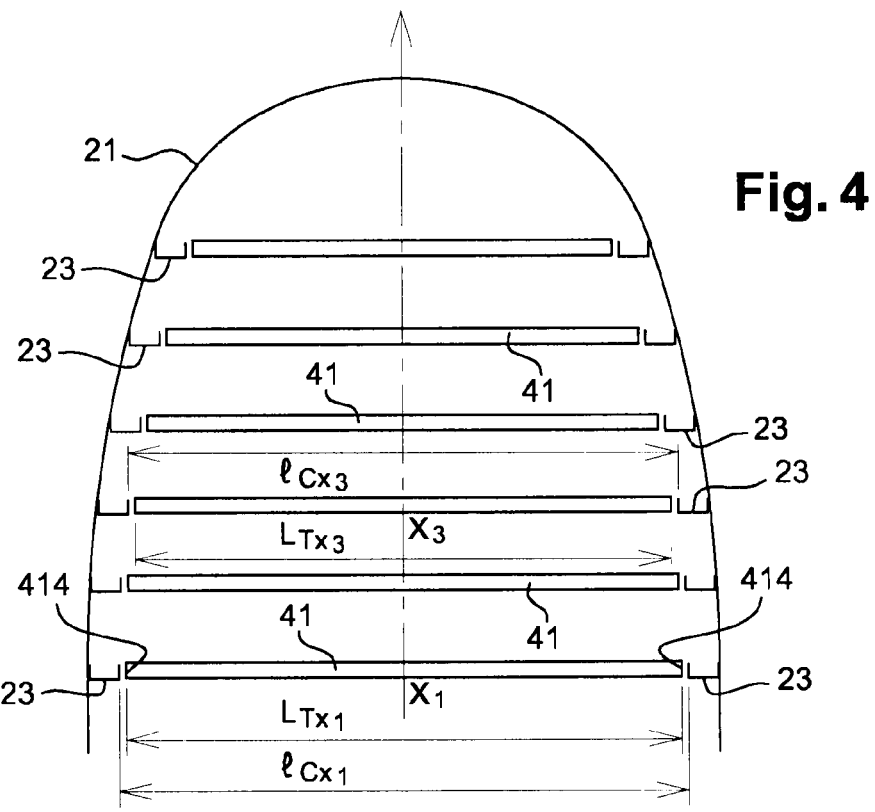

Each frame 23 of the fuselage section, as shown in FIG. 4, defines, at the X position in question and at floor level 4, an obstacle-free interior width, known as free frame passage $l_c$. For example, an obstacle-free interior width $l_{Cx1}$ at position X1, an obstacle-free interior width $l_{Cx3}$ at position X3.

The free frame passages $l_{Cx}$ of successive frames are increasing or decreasing monotonic functions of position X.

Figure 2B:
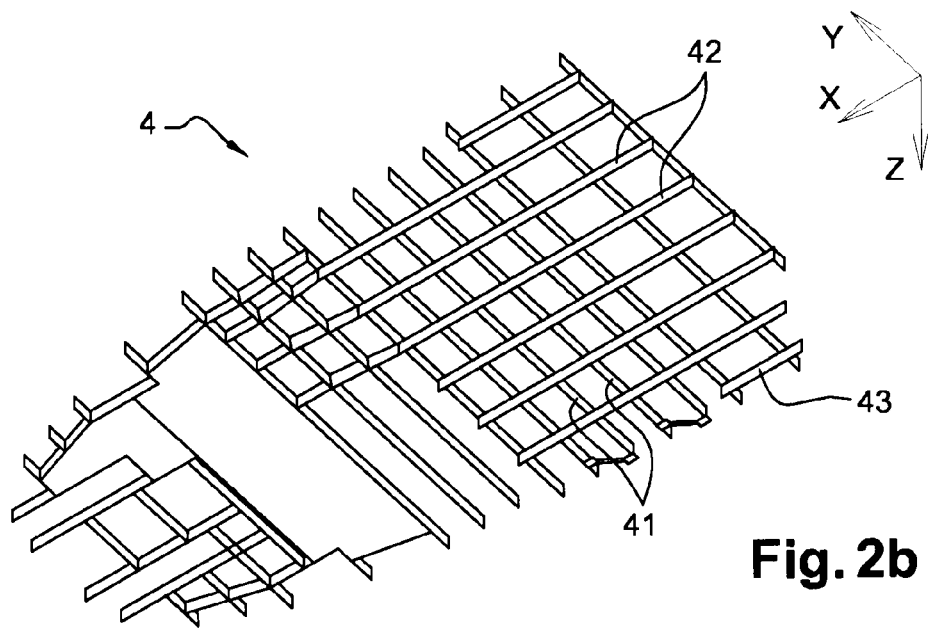

The floor 4, as shown in FIG. 2b, is formed by an assembly between a plurality of cross members 41 extending along the lateral axis Y of the aircraft and a plurality of rails 42 and false rails 43 extending along the longitudinal axis X. The cross members 41 are spaced apart, depending on the desired structural strength of the floor. Each cross member has a length $L_{Tx}$ according to the X position in question, for example a length $L_{Tx1}$ at position X1, a length $L_{Tx3}$ at position X3.

Figure 3B:
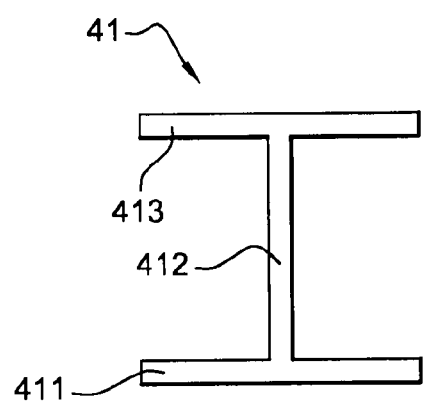

In the example of realization described, each cross member 41 has an I-shaped cross section and has a baseplate 411, a core 412 and a head 413, as illustrated in FIG. 3b.

A cross member is a beam supported at its opposite ends and a cross member with a different cross section, for example a C-shaped cross section, is also feasible.

According to the invention, for each position along the longitudinal axis X defined by a segment of the section containing a frame 23 and a cross member 41, the length $L_{Tx}$, between opposite ends 414 of the cross member in question is less than the free frame passage $l_{Cx}$.

To assemble the floor 4 to the body structure 2 according to the invention, each cross member 41, at each end 414, is fixed to the body structure 2 via an intermediate structural assembly 24, 29. Said intermediate structural assembly is connected on the one hand to the cross member 41 and on the other hand to the layer 21 and/or to one or more frames 23.

Figure 5:
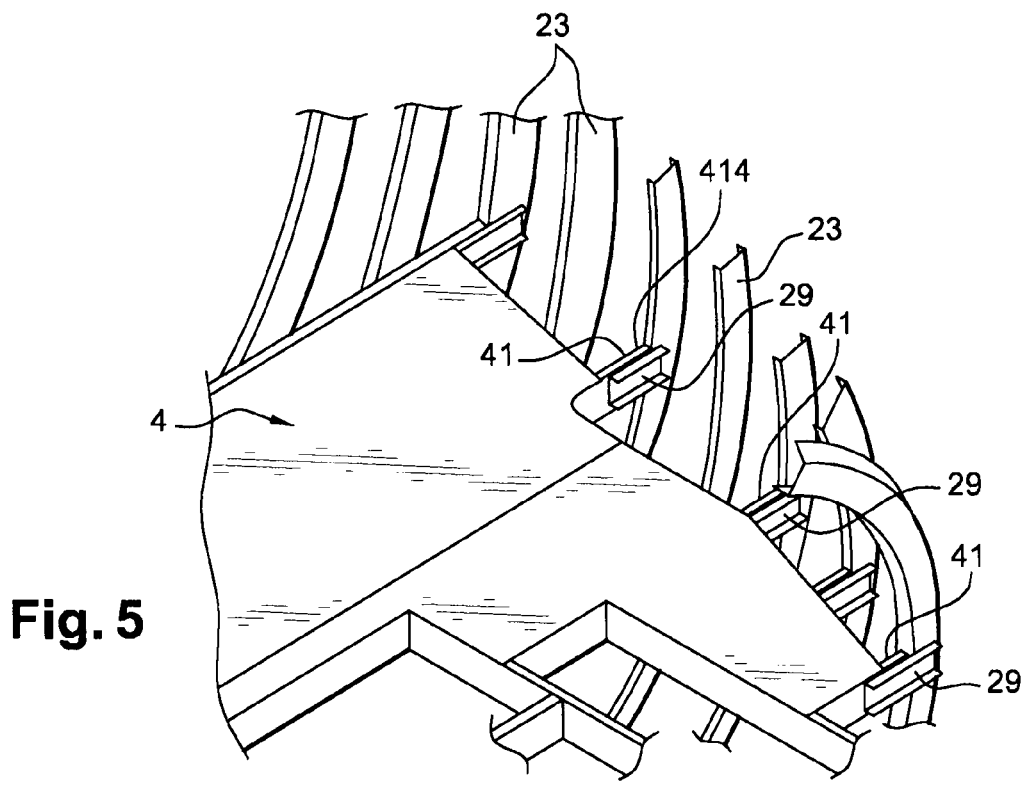

In a first embodiment of the invention, each cross member 41 of the floor 4 is assembled at each end 414 to a frame 23 of the body structure 2 via a fishplate 29, as illustrated in FIG. 5.

Each fishplate 29 comprises at least one bearing surface 291 resting on the one hand on the core 412 of the cross member 41 and the other hand on the core 232 of the frame 23. Each fishplate 29 extends over a sufficient portion of the length of the cross member 41 and the height h of the frame 23 so that it can be fixed there and ensure the even distribution of forces between the cross member 41 and the frame 23.

When, because of manufacturing tolerances, the cores of the cross members and the frames are offset, not in line with each other, shims associated with fishplates or parts with an adaptable shape are used to compensate for this offset. A shim with a width approximately equivalent to the offset between the crossbar and the frame is introduced between the cross member or frame and the fishplate so that said fishplate rests on a substantially flat surface on the cross member and frame.

The flexibly-shaped part comprises at least one bearing surface, not flat, resting on the one hand on the core of the cross member and on the other hand on the core of the frame, that handles the offset between the cross and the frame without requiring the addition and operation of an additional, wedge-type, part.

To strengthen the structure, false rails (not shown) are installed close to cross member 41-frame 23 connections.

To stabilize the floor and absorb energy in the event of a crash, anti-crash rods (not shown) connect the false rails to stringers (not shown).

Figure 6:
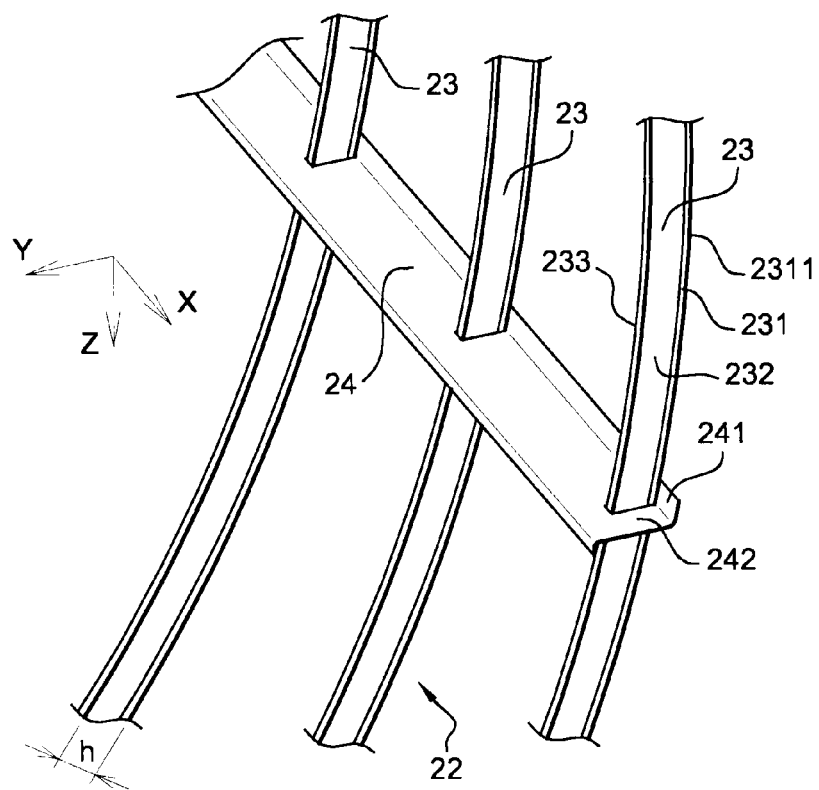

In a second embodiment of the invention, the intermediate structural assembly comprises one or more sets of support members, connected to all or some of the frames 23, forming a structure called a cornice 24, as shown in FIG. 6.

The cornice 24 has a straight cross-section, known as L-shaped, and comprises a baseplate 241 and a core 242.

The core 242 of the cornice 24 is mainly oriented along the longitudinal axis X and comprises a first bearing surface 2421, positioned vertically along the Z axis so that said first surface of the core 242 of the cornice 24 defines a mounting surface on which to fix the cross members 41 of the floor 4.

In a particular form of embodiment, the cross members 41 are each substantially opposite a reinforcing frame.

Advantageously, the cornice comprises a baseplate 241 comprising a bearing surface 2411 fixed on the interior surface 211 of the external skin 21.

Preferably, the bearing surface 2411 of the baseplate 241 of the cornice 24 is shaped to the geometry of the external skin 21.

In an example of realization of the cornice, at least one support element is positioned between two frames 23 and fixed on said two frames, such that the first bearing surface 2411 of the baseplate 241 of the cornice is substantially flush with the bearing surface of 2311 of the outer baseplate 231 of each frame 23.

In another example of realization of the cornice, at least one support element extends along the longitudinal axis on at least two inter-frames and comprises at least one notch 243, each notch allowing the passage of a frame 23.

Each notch 243 is produced in the baseplate 241 of the cornice 24 and extends into the core 242 of said cornice so as to receive a frame 23 and so that a first bearing surface 2411 of the baseplate 241 of the cornice 24 is substantially flush with the bearing surface 2311 of the outer baseplate 231 of each frame 23.

Advantageously, the notches 243 have dimensions substantially greater than the dimensions of the cross-section of the frames 23. The dimensions of the notches 243, selected taking into account the dimensional tolerances of the frames and the positioning tolerances of each frame, avoiding mechanical interference between the cornice 24 and the frames 23.

As with the frames 23, and to ensure a more even distribution of forces between the cornice 24 and the external skin 21, said external skin is attached to the cornice 24 by any conventional means or by bonding, depending on the material of the elements to be assembled.

Figure 7:
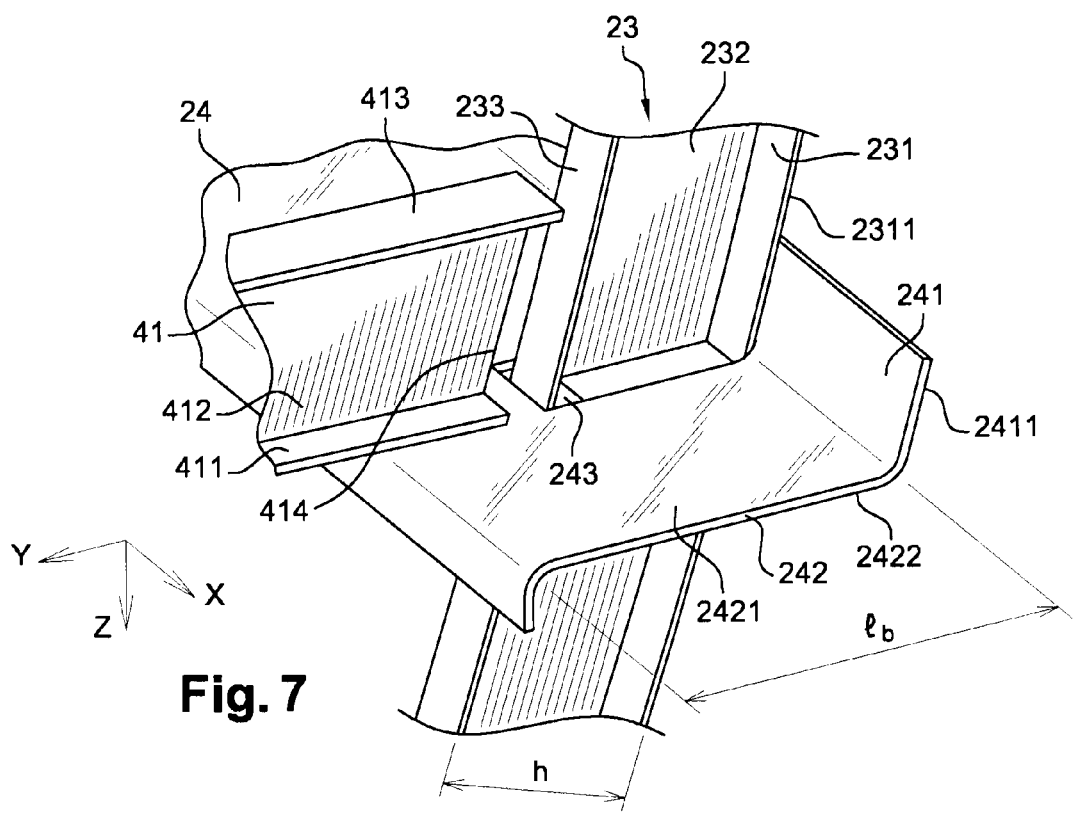

Preferably, as illustrated in FIG. 7, the core 242 of the cornice 24 has a length $l_b$, along the lateral axis Y, substantially greater than the height h of the frame so as to pose and fix the ends 414 of cross members 41, including when the cross members are positioned substantially opposite frames.

Figure 8:
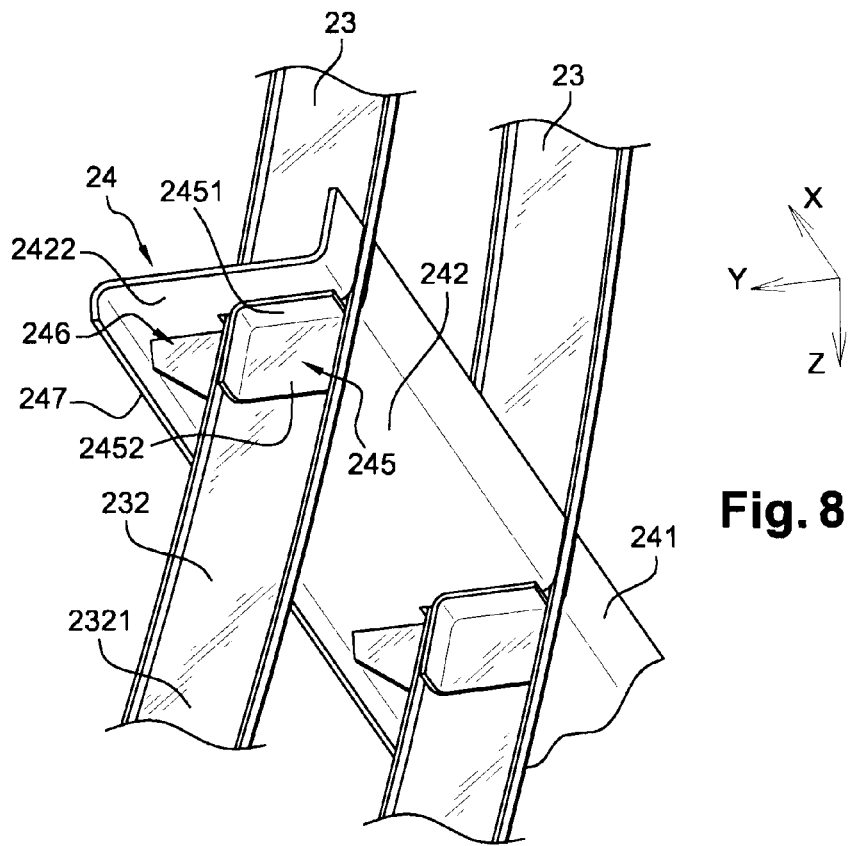
FIG. 8, is a bottom view in perspective of the cornice retained by angle irons, according to the second embodiment of the invention, FIG. 9a, a cross-section view of the floor/body structure assembly through the cornice according to the second embodiment of the invention, FIG. 9b, a cross-section in a horizontal plane of the cornice of FIG. 9a, FIG. 10, a bottom view in perspective of a longitudinal beam assembled to the cornice according to the second embodiment of the invention.

Preferably, the core 242 of the cornice 24 is strengthened and held in a plane substantially parallel to the plane of the floor, at each frame 23, by at least one angle bar 245, 246 comprising at least two surfaces, one of which is fixed on the core 232 of each frame 23, as illustrated in FIG. 8.

There at least one angle bar 245, 246 is realized so as to absorb the Z forces associated with the masses positioned on the floor 4.

In an example of realization, as shown in FIG. 8, an angle bar 245 comprises a first surface, called the baseplate 2451, connected to a second bearing surface 2422, opposite the first bearing surface 2421 of the core 242 of the cornice 24. Said angle bar comprises a second surface, called the core 2452, connected to a first bearing surface 2321 of the core 232 of a frame 23 in the closed area of the C- or I-shaped frame.

Figure 9A:
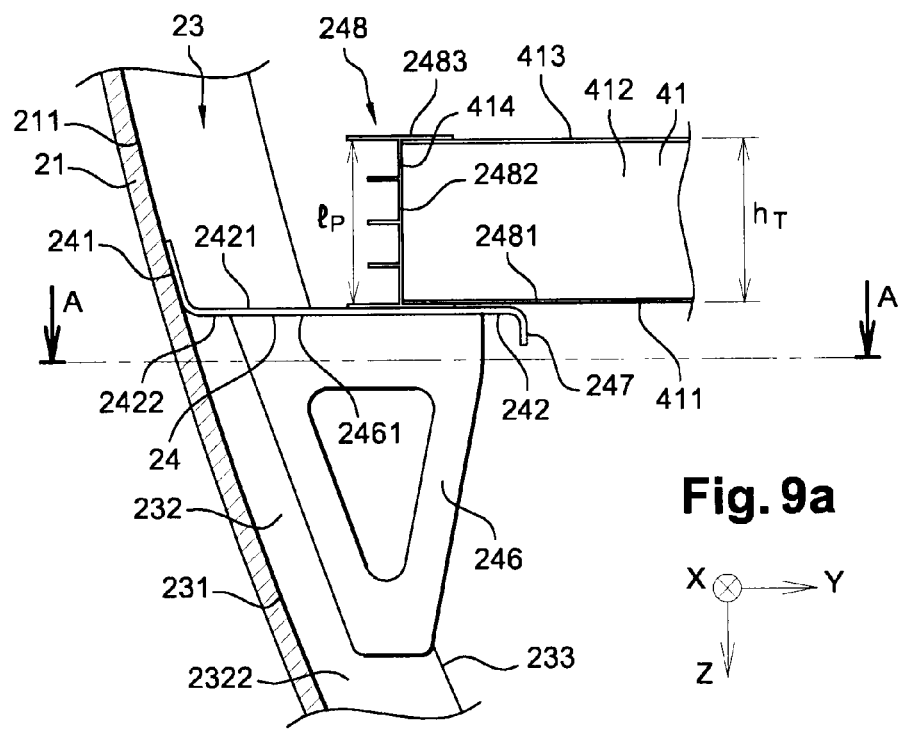
Figure 9B:
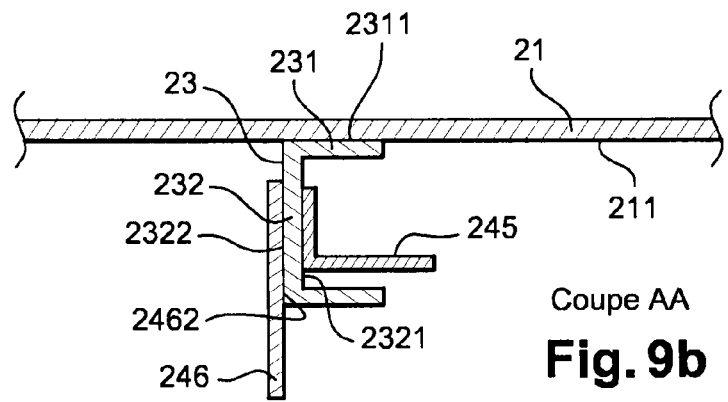

In another example of realization, as shown in FIGS. 9a and 9b, the angle bar is formed by a bracket 246 on each frame 23, so that said bracket extends under the cornice 24, outside the frame 23 in a direction opposite to the external skin 21. The bracket 246 comprises a first surface, known as the baseplate 2461, connected to the second bearing surface 2422 of the cornice 24. Said bracket comprises a second surface, called the core 2462, connected to a second bearing surface 2322, opposite the first bearing surface 2321, of the core 232 of the frame 23.

Preferably, the cornice 24 comprises, at one end of the core 242 opposite the baseplate 241, a raised edge 247 in a direction opposite to the cross members 41, so as to enhance the stability of said cornice without interfering with said cross members.

Thus, because of the continuity of the connection between the floor 4 and the framework 22 of the body structure 2 of the fuselage section, the use of anti-crash rods is no longer necessary, the substantially horizontal core 242 of the cornice 24, connected to the external skin 21 and the floor 4, performing this function.

Figure 10:
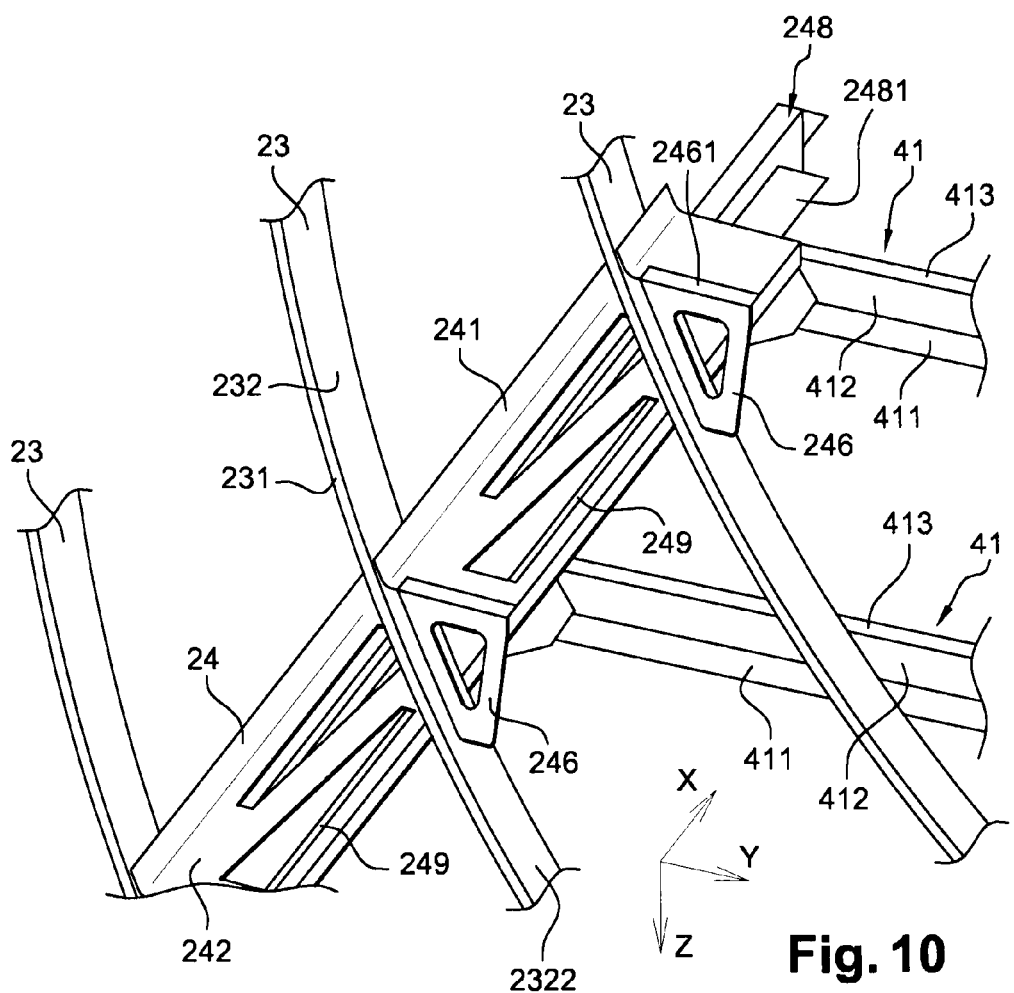

In one example of realization, as shown in FIGS. 9a and 10, in order to provide additional stabilization for the floor in the event of a crash, the floor comprises a set of stabilizing elements forming a structure, called a longitudinal beam 248, which is connected to all or some of the cross members 41, at their ends 414, and which is fixed to the first bearing surface 2421 of the core 242 of the cornice 24. The longitudinal beam has a function substantially identical to that of a false rail. The longitudinal beam 248, having an I-shaped cross section and comprising a baseplate 2481, a core 2482 and a head 2483, is oriented substantially along the X axis and is fixed by said baseplate on the bearing surface 2421 of the core 242 of the cornice 24.

The core 2482 of the longitudinal beam 248 has a width $l_p$ substantially greater than a height $h_T$ of each cross member 41 so that the ends 414 of said cross members are embedded against the core 2482 of said longitudinal beam, between the head 2483 and the baseplate 2481.

Longitudinal beams having a different cross section, for example a C-, J- or T-shaped cross section, are also possible.

Preferably, to take a case of explosive decompression into account and thus provide air circulation between a space located above the floor, for example a cabin, and a space below the floor, such as a cargo compartment, the cornice 24 and the longitudinal beam 248 each comprise air communication openings (shown in FIG. 10 by the reference 249 for the cornice and not shown for the longitudinal beam) at their respective cores 242, 2482 and between each frame 23, said air communication openings also permitting a lighter structure.

The second embodiment of the invention has the advantage of separating the cross members from the frames by means of the cornice. By replacing the cross members/frames connection of the prior state of the art by a cross members/cornice and cornice/frames connection according to the invention, the assembly tolerances on the positioning of the frames 23 are separate from the assembly tolerances on the positioning of the cross members of the floor 4. Less restrictive assembly tolerances between the floor's cross members and the body structure's frames thus make an easier installation of the floor in the body structure possible, and consequently a reduced installation time.

Advantageously, the cornice 24 provides a continuous connection between the frames 23, the external skin 21 and the floor 4, thereby avoiding a swelling effect due to the pressurization of the aircraft.

Advantageously, in addition to supporting cross members 41, the cornice 24 allows the functions of one or more stringers 25 to be carried out by participating in stiffening the external skin 21 of the fuselage 2, stringers which can therefore be removed in the vicinity of said cornice.

In an example of realization, the cornice 24 is made of a metallic material such as titanium, for example by a process of superplastic forming, known as SPF.

In another example of realization, the cornice 24 is made of a composite material, for example by a process of thermoplastic forming.

For this second embodiment the invention is described in the case of a cornice 24 having an L-shaped cross section, without this choice limiting the invention. The implementation of the invention can be adapted to cornices having a different cross section, e.g. a T-shaped cross-section, without departing from the scope of the invention.

In a third embodiment, combined from the first two modes, at least one cross member 41 of the floor 4 is fixed at each end 414 to a frame 23 by a fishplate 29 to serve as a reference frame and the remaining 41 cross members are fixed on the body structure 2 by means of the cornice 24.

According to the invention, the body structure 2 and the floor 4 are produced separately and then assembled.

To assemble the floor 4 and the body structure 2 of a fuselage section according to the invention, a first step consists of producing the body structure 2.

The body structure 2 is produced by assembling on the one hand structural elements constituting the framework 22, which are among others the frames 23 and stringers 25, and on the other hand the outer skin 21.

The structural elements of the framework 22 and the external skin 21 are assembled together by any conventional means and then fixed to each other, for example by bonding or riveting, to form the body structure 2.

In a second step, the floor 4 is produced.

The floor 4 is produced by assembling structural elements constituting the floor 4, which are among others the cross members 41, the rails 42 and the false rails 43.

The floor is produced so that each cross member 41 has, between its opposite ends 414 and the X position of the cross member, a length substantially less than the free frame passage in question.

The structural elements of the floor 4 are assembled together by any conventional means and then fixed to each other to form the floor structure 4.

The order for implementing steps 1 and 2 and is not fixed and, according to the method, the two steps can be carried out in reverse order to the order described or carried out simultaneously without changing the outcome of said steps.

In a third step, after this, the floor 4 is placed inside the produced body structure 2 and fixed to the body structure.

The floor 4, previously produced, is introduced into the body structure 2, previously produced, on the side of the frame with the widest free frame passage and substantially to its Z destination position The ends of the cross members 41 are positioned and fixed to the framework 22 of the body structure 2 by means of an intermediate structural assembly 24, 29.

In an example of the implementation of the third step, the ends 414 of the cross members 41 of the floor are each placed substantially opposite a reinforcing frame 23 and structurally joined to the reinforcing frames by the fishplates 29.

In another example of the implementation of the third stage, the ends 414 of the cross members 41 are each placed on the angle bar 24 fixed to the frames 23 of the body structure 2.

The method, by a subsequent positioning of the floor on a previously constructed body structure, makes it possible to carry out a pre-installation of said floor with electrical harnesses.

This method is applicable to a fuselage section made of a metal material but it is particularly suited to a fuselage section made of a composite material where the body structure can be achieved more easily in one piece, closed circumferentially.

The invention claimed is:

1. A section of aircraft fuselage, comprising:
   a body structure, circumferentially closed; and
   a floor connected to said body structure, the section is associated with a section reference frame defined by a longitudinal axis X, a lateral axis Y in a plane perpendicular to the longitudinal axis X oriented in a horizontal direction when the floor is horizontal and comprising a Z axis in a plane perpendicular to the longitudinal axis X oriented in a vertical direction when the floor is horizontal,
   wherein said body structure comprises:
      at least two frames, positioned along fuselage segments substantially perpendicular to the longitudinal axis X, an external skin supported on each frame,
   wherein each frame defines an obstacle-free interior width, at a floor level, known as a free frame passage $l_{Cx}$, the free frame passages of successive frames being increasing or decreasing monotonic functions of a position X,
   wherein the floor has at least two cross members, each of the cross members being parallel to the lateral axis Y and substantially in a frame plane and each of the cross members extending from a respective first end to a respective second end,
   wherein at every point of each free frame passage, a length $L_{Tx}$ of each of the cross members is less than the free frame passage $l_{Cx}$,
   wherein a mounting surface of each cross member, at the first end and at the second end, is fixed to the body structure by an intermediate structural assembly, which connects the mounting surface of each cross member to the external skin and to at least one of the frames, and able to realize an individual embedding connection of each end of each cross member with the body structure, and
   wherein the intermediate structural assembly comprises a cornice, the cornice including a first core that connects to the at least two frames, the first core defining a first bearing surface on top of which the mounting surface of one of the first end and the second end is directly placed.

2. A section of aircraft fuselage according to claim 1 wherein the first core is positioned vertically along the Z axis in the section reference frame such that said first bearing surface of the first core of the cornice has a width $l_b$ substantially greater than a height h of one of the frames.

3. A section of aircraft fuselage according to claim 2 wherein the cornice comprises a baseplate having a bearing surface substantially flush with a bearing surface of an outer baseplate of each of the at least two frames and the baseplate is fixed to an inner surface of the external skin.

4. A section of aircraft fuselage according to claim 2, wherein at least one support element forming the cornice extends along the X axis on at least two inter-frames and comprises at least one notch for the passage of each of the at least two frames.

5. A section of aircraft fuselage according to claim 2, wherein each intermediate structural assembly comprises at least one bracket, said at least one bracket comprising at least two surfaces, a first surface, known as a baseplate, connected to the first core of the cornice and a second surface, known as a second core, connected to a third core of each of the at least two frames.

6. A section of aircraft fuselage according to claim 5 wherein the at least one bracket is fixed on a part of the third core of each of the at least two frames and extends under the cornice in a direction opposite to the external skin, beyond each of the at least two frames.

7. A section of aircraft fuselage according to claim 2, wherein the first core of the cornice has openings for air communication between a space located above the floor and a space below the floor.

8. A section of aircraft fuselage according to claim 2, wherein the floor comprises a set of stabilizing elements forming a longitudinal beam, connected to at least one of the cross members, at the ends of said cross members, and fixed to the first bearing surface of the core of the cornice.

9. A section of aircraft fuselage according to claim 2, wherein the first bearing surface is a top surface of positioned vertically along the Z axis.

10. A method of assembling a floor on a body structure of a section of aircraft fuselage according to claim 1, comprising:
- producing the body structure comprising the frames and external skin,
- producing the floor comprising the cross members, independent of the production of the body structure, such that each cross member is shorter than the free frame passage at the X position of the cross member in question, and
- introducing the floor into the body structure on the side of the frame with the widest free frame passage, approximately in its Z destination position and structural junction of the floor and the body structure by an intermediate structural assembly able to produce an individual embedding connection for each end of each cross member.

* * * * *